(12) United States Patent
Dietrich et al.

(10) Patent No.: US 6,427,283 B1
(45) Date of Patent: Aug. 6, 2002

(54) WINDSCREEN WIPER

(75) Inventors: Jan Dietrich, Buehl; Thomas Kotlarski, Bad Neuenahr, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,292

(22) PCT Filed: Sep. 16, 1999

(86) PCT No.: PCT/DE99/02947

§ 371 (c)(1),
(2), (4) Date: Oct. 2, 2000

(87) PCT Pub. No.: WO00/37293

PCT Pub. Date: Jun. 29, 2000

(30) Foreign Application Priority Data

Dec. 21, 1998 (DE) .......................... 198 59 077

(51) Int. Cl.[7] .................................. B60S 1/38
(52) U.S. Cl. ................ 15/250.32; 15/250.43; 15/250.44; 15/250.46; 15/250.451
(58) Field of Search .......... 15/250.47, 250.44, 15/250.32, 250.361, 250.43, 250.451, 250.46

(56) References Cited

U.S. PATENT DOCUMENTS 2,876,482 A * 3/1959 Oishei ................. 15/250.44
3,058,141 A * 10/1962 Christen ............... 15/250.43
3,224,028 A * 12/1965 Peras et al. ............ 15/250.44
3,386,126 A * 6/1968 Hadekel ................ 15/250.44
3,399,419 A * 9/1968 Wise .................... 15/250.47

FOREIGN PATENT DOCUMENTS

| DE | 2404529 | * | 8/1974 | ............. | 15/250.47 |
| DE | 2459606 | * | 7/1975 | ............. | 15/250.46 |
| DE | 2613439 | * | 10/1977 | ............. | 15/250.44 |
| DE | 26 15 292 A | | 10/2000 | | |
| EP | 0 528 643 A1 | | 2/1993 | | |

* cited by examiner

Primary Examiner—Gary K. Graham
(74) Attorney, Agent, or Firm—Michael J. Striker

(57) ABSTRACT

The invention relates to a windshield wiper (10) for wiping windows, in particular of motor vehicles, having a connection piece (14) which can be connected to a wiper arm (12) and which is connected to a flat bar (16), and having a wiper strip (18) which is connected to the flat bar (16) and can be pressed against the window to be wiped. It proposed that the flat bar (16) has at least one joint (20, 26, 28), whose pivot axis (21) is oriented transversely to the longitudinal extent of the flat bar (16) and in the direction of its width.

7 Claims, 2 Drawing Sheets

WINDSCREEN WIPER

BACKGROUND OF THE INVENTION

The invention relates generally to a windshield wiper having a connection piece which can be connected to a wiper arm and which is connected to a flat bar, and which has a wiper strip which is connected to the flat bar and can be pressed against the window to be wiped. Such windshield wipers are known for instance from European Patent EP 0 528 643, and they are distinguished over conventional wiper blades in that instead of a complicated support bracket frame, the contact pressure exerted by the wiper arm is transmitted to the wiper strip via a so-called flat bar. The flat bar as a rule comprises a pre-curved spring steel or a plastic rod. The wiper strip is glued to the flat bar, or it is received by the flat bar in the recesses intended for it.

For windshield wipers that have support bracket frames, it is known from German Patent Disclosure DE-OS 26 15 292 to form the support bracket of a wiper blade from two bracket parts, which have recesses and protrusions graduated in shoulderlike fashion. In the assembled position, the protrusions engage the recesses and are rotatably connected to one another via a pivot bolt that penetrates the protrusions. By way of the joint thus formed, the bracket parts can be pivoted relative to one another. In this way, an easily installed support bracket frame for a wiper blade is obtained.

ADVANTAGES OF THE INVENTION

The windshield wiper of the present invention has the advantage that because of the joint placed in the flat bar, the windshield wiper can be adapted exactly to even an extreme window curvature. The flat bar which is curved in the unloaded state must have a course of curvature in the unloaded position that is maintained precisely during wiping operation for a predetermined contact pressure distribution. By splitting that flat bar into at least two pieces, the part size that has to be machined and, thus, tool costs are less, and conversely the part tolerances to be expected are easier to adhere to.

From an assembly standpoint, it is especially simple if the joint is disposed in the region of the connection piece. The connection piece can then in turn take on a guide, stop and retention function. If one or more joints are disposed outside the region of the connection piece, then the flat bar can be adapted even more precisely to the curved course of the window to be wiped.

The contact pressure distribution which is definitively responsible for the wiping quality can be optimally set if the pieces, which are spring-connected to the joint or joints, are spring-loaded relative to one another. The joints can then be pressed in prestressed fashion against the surface of the window to be wiped. The prestressing can be composed of the intrinsic elasticity of the spring bar pieces on the one hand and of the spring-mounted joints on the other.

An especially simple stop to prevent excessive bending backward of the joint or joints is achieved if the two flat bar pieces that form the joint each have at least one extension that protrudes past the respectively other piece. The extensions are then braced on the respectively other pieces and prevent the flat bar from being hinged away from the window. The spring support of the joints can be achieved especially simply by placing an elastic element between each piece and the extension that protrudes past the piece. The elastic element is formed in the simplest case by the rubber of the wiper strip. In this way, an extremely economical flat bar wiper blade is made available that by way of the prestressing and the choice of spring furnishes an optimal distribution of contact pressure.

BRIEF DESCRIPTION OF THE DRAWINGS

Exemplary embodiments of the windshield wiper of the invention are shown in the drawing and described in further detail below. Shown are FIG. 1, a windshield wiper connected to a wiper arm, seen from the side, in a first exemplary embodiment.

DETAILED DESCRIPTION OF THE PREFERRED EMBODIMENTS

Figure 1:
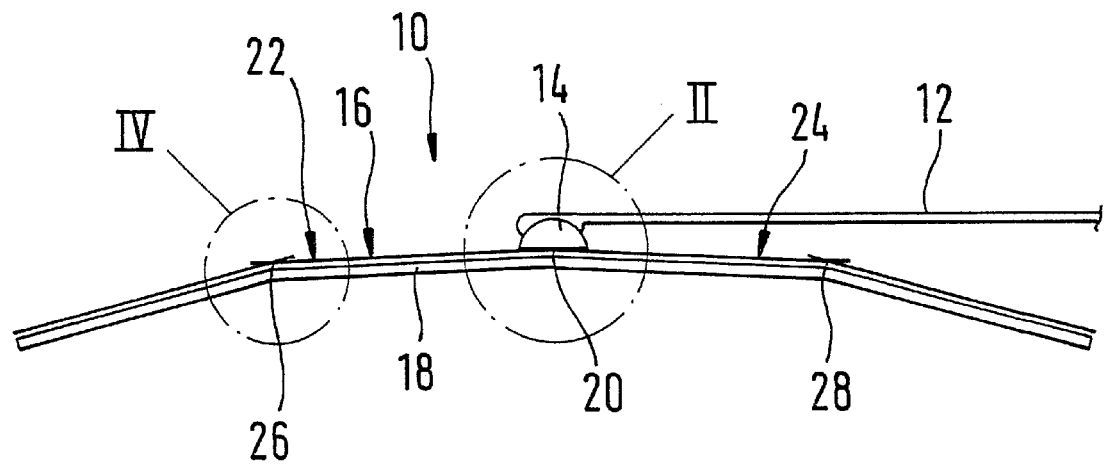

In FIG. 1, a windshield wiper 10 is shown that can be driven by a wiper arm 12. The wiper arm 12 engages a connection piece 14 of the windshield wiper 10, which in turn is connected to a flat bar 16, which is represented merely as a line in FIG. 1. On the side of the flat bar 16 opposite the connection piece 14, there is a wiper strip 18, which can be pressed against a windshield, not shown, of a motor vehicle. In the exemplary embodiment, the wiper strip 18 is glued on, but it can also be vulcanized on or clipped into recesses of the flat bar 16. It is also possible for one or two flat bars 16 to be placed in recesses of the wiper strip 18.

In the region of the connection piece 14, the flat bar 16 has a first joint 20, which separates the flat bar 16 into at least one first piece 22 and one second piece 24. A second joint 26 and a third joint 28, which subdivide the first and second pieces 22 and 24 into further pieces, respectively, are also disposed outside the connection piece 14, in the region of the first piece 22 and the second piece 24, respectively. The pivot axis 21 (FIG. 2) of the joint 20 is oriented transversely to the length of the flat bar 16 and in the direction of its width.

Figure 2:
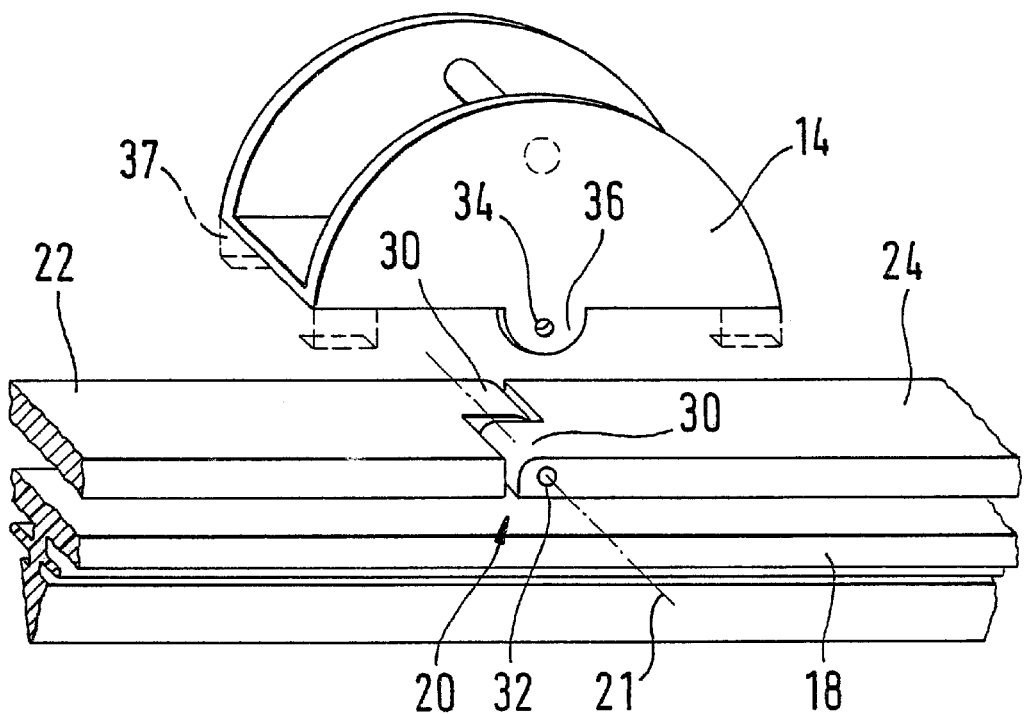
FIG. 2, a detail indicated by line II in FIG. 1 in an exploded view.

In FIG. 2, the first joint 20 is shown in an exploded view. The two pieces 22 and 24 each have one shoulder 30 in the region of the joint 20, and with this shoulder they overlap one another in the assembled position. The shoulders 30 are pierced by a bore 32, and in the installed state these bores are aligned with one another and receive a pivot bolt (not shown). The connection piece 14 rests on the flat bar 16 on the side opposite the wiper strip 18 and, with a sheet-metal tab 36 that has a bore 34, it fits over the pivot region. The bore 34 is aligned with the bore 32 and in the assembled state is also pierced by the bolt, not shown.

The connection piece 14, because of its length in the longitudinal direction of the windshield wiper, forms a stop that prevents the two pieces 22 and 24 from pivoting in the direction away from the between the window.

It is shown in suggested form in FIG. 2 that the connection piece 14 can have further sheet-metal tabs 37, which clasp the spring bar 16 and form a stop in the other direction. Stops are not absolutely necessary, however, because the wiper strip 18 secured to the flat bar 16 presents a restoring force that counters overly sharp kinking of the joint 20.

Figure 3:
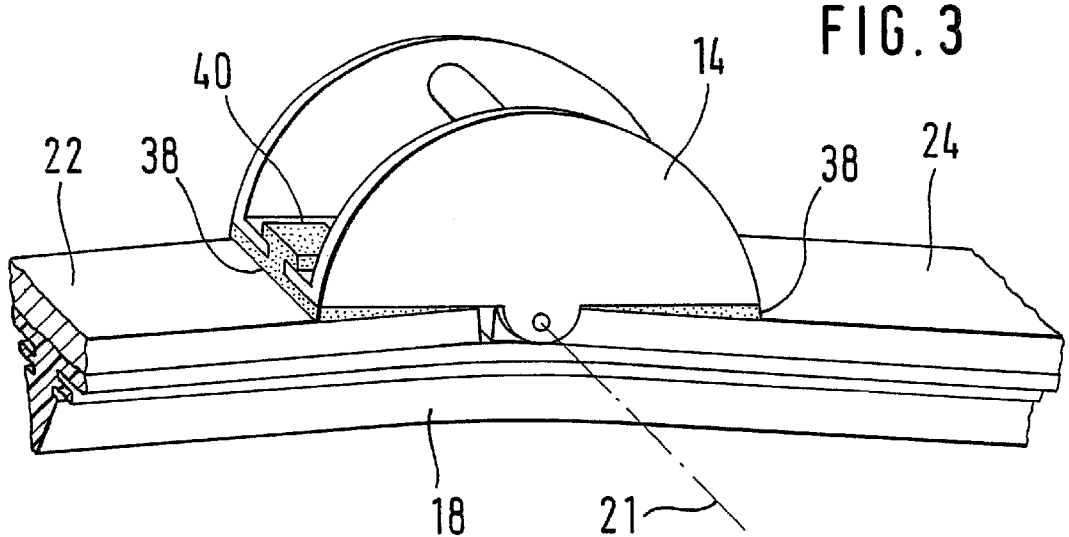
FIG. 3, a view similar to FIG. 2 in the assembled position, for a second exemplary embodiment.

In FIG. 3, a further exemplary embodiment is shown, in which identical elements are provided with the same reference numerals. A wedgelike elastic means in the form of a rubber pad 38 is placed between the connection piece 14 and the pieces 22 and 24, respectively, of the flat bar 16, and these pads force the pieces 22 out of the plane into a slightly kinked position. The amount of deflection out of the plane is determined by the size of the rubber pad and by its spring constant in proportion to the spring constant of the wiper strip that counteracts this kinked setting.

In the exemplary embodiment of FIG. 3, the rubber pad 38 is a separate part, which is secured to the connection piece 14 with an attachment piece 40 that has a collar. To that end, the connection piece 14 has a recess, which receives the attachment piece 40 and is clasped by the collar of the attachment piece 40.

Figure 4:
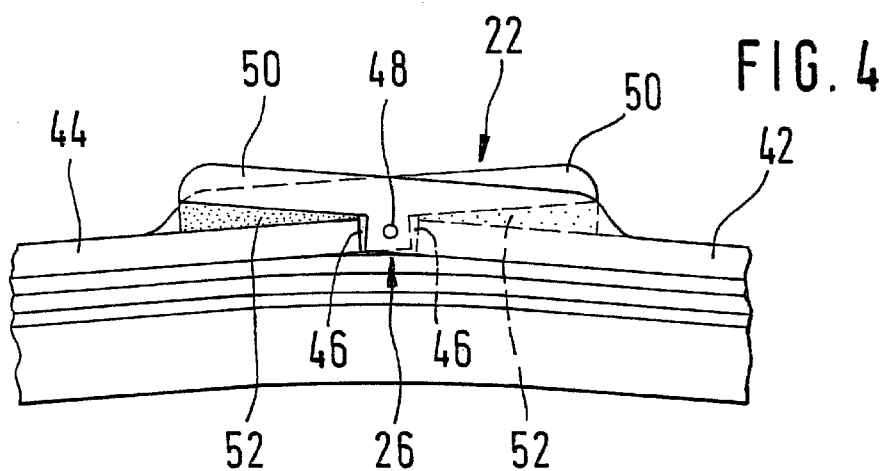
FIG. 4, a detail along line IV in FIG. 1.
Figure 5:
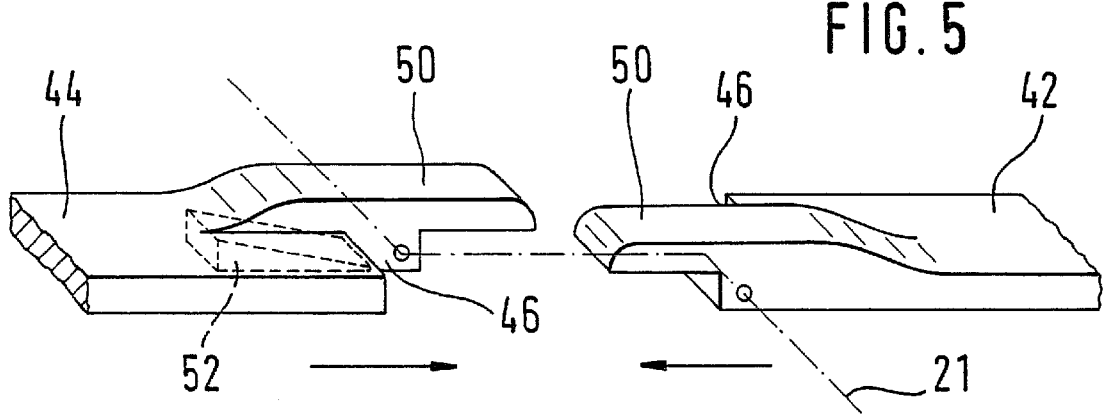
FIG. 5, the detail of FIG. 4, taken apart.

In FIGS. 4 and 5, the second joint 26 is shown, which divides the first piece 22 into two subsidiary pieces 42 and 44 in turn and pivotably connects them to one another. To that end, the subsidiary pieces 42 and 44 have a shoulder 46, analogous to the shoulder 30, and are also pierced by an aligned bore, which in turn receives a pivot bolt 48. In the assembled position, the bolt axis is coaxial to the pivot axis 21.

For stop limitation and for the sake of better lateral guidance, the pieces 42 and 44 each have a respective extension 50, which extends from the shoulder 46 in the direction of the respectively other piece 42 and 44. The extension 50 is disposed above the flat bar 16, on the side opposite the wiper strip 18, and in the assembled position thus rests, in the manner of a stop limitation, on the respectively other piece 42 and 44.

It is also possible in principle to provide only one extension 50 per joint.

An elastic element in the form of a rubber pad 52 is placed between the extension 50 and the respective piece 42 and 44 over which the extension 50 fits. This rubber pad 52 is wedge-shaped and forces the two pieces 42 and 44 into a kinked position oriented toward the window curvature. Analogously to the first joint 20, here again the geometric variables of the rubber pad and the spring constants of the rubber pad 52 and of the wiper strip 18 predetermine the kinked position of the unloaded wiper blade. The rubber pad 52 is shown here as a separate part, but it can also be part of the wiper strip 52 and can extend from the wiper strip through recesses in the flat bar 16 into the pivot region. The rubber pad 52 could thus also take on a retention function of the wiper strip 18 relative to the flat bar 16.

In the loaded state, that is, when the windshield wiper 10 is pressed against the window to be wiped, the contact pressure exerted by the wiper arm 12 is transmitted via the connection piece 14 to the flat bar 16 and in turn by it to the wiper strip 18. The geometric cross-sectional shape, the curvature of the unloaded wiper blade, and the material constants of the wiper strip 18 and the spring bar have an influence on the distribution of contact pressure of the wiper strip 18 on the window. By means of the joints 22, 26, 28 and their rubber pads 38, 52, the contact pressure distribution can furthermore be varied independently of the specifications of the flat bar 16. To make it possible to follow even extreme window curvature courses exactly, it can be advantageous if a plurality of joints are distributed over the flat bar 16. It is not absolutely necessary for the joints to be disposed symmetrically with respect to the longitudinal extent of the flat bar 16.

It is also conceivable, instead of the extensions 50, to provide a stop part which simulates the connection piece—and which does not contain the requisite lateral cheeks for retaining the wiper arm, nor the pivot bolt. This connection piece would then be placed analogously on the side opposite the wiper strip 18 and fixed via the pivot bolt. A stop limitation can be effected then by way of clawlike extensions 38.

If the flat bar 16 rests in a recess that pierces the wiper strip 18 lengthwise or in lateral longitudinal grooves of the wiper strip 18, then the rubber pads 38, 52 may be omitted. The extensions 50 can also be dispensed with under some circumstances.

It will be understood that each of the elements described above, or two or more together, may also find a useful application in other types of constructions differing from the types described above.

While the invention has been illustrated and described as a windshield wiper for an automobile, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A windshield wiper for wiping windows having a connection piece (14) which can be connected to a wiper arm (12) and which is connected directly to a flat bar (16), and having a rubber wiper strip (18) which is connected directly to an underside of the flat bar (16) along its length and can be pressed against the window to be wiped, characterized in that the flat bar (16) has at least one joint (20, 26, 28), whose pivot axis (21) is oriented transversely to a longitudinal extent of the flat bar (16) and in a direction of a width of said flat bar (16).

2. The windshield wiper of claim 1, characterized in that the joint (20) is disposed in a region of the connection piece.

3. The windshield wiper of claim 1, characterized in that at least one second joint (26, 28) is disposed outside a region of the connection piece (14).

4. The windshield wiper of claim 1, characterized in that the joint (20, 26, 28) connects two pieces (22, 24, 42, 44) to one another that are spring-loaded relative to one another.

5. The windshield wiper of claim 1, characterized in that the joint comprises first and second flat bar pieces, wherein each said flat bar piece has at least one extension (50), said extension protruding past the respective other flat bar piece (44, 42).

6. The windshield wiper of claim 5, characterized in that an elastic element (52) is disposed between one of the first and second flat bar pieces (42, 44) and the respective extension (50) that protrudes past said one of the first and second flat bar pieces (42, 44).

7. The windshield wiper of claim 6, characterized in that the elastic element (52) is part of a material forming the wiper strip.

* * * * *